United States Patent
Ballenger et al.

(10) Patent No.: US 7,030,567 B2
(45) Date of Patent: Apr. 18, 2006

(54) PHASE-CONTROL POWER CONTROLLER WITH DIGITAL RMS LOAD VOLTAGE REGULATION

(75) Inventors: Matthew B. Ballenger, Lexington, KY (US); George B. Kendrick, Lexington, KY (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 11/051,597

(22) Filed: Feb. 4, 2005

(65) Prior Publication Data

US 2005/0110435 A1    May 26, 2005

(51) Int. Cl.
*H05B 37/02* (2006.01)
*G05B 24/02* (2006.01)
(52) U.S. Cl. ..................... 315/209 SC; 315/209 R; 315/224; 315/308; 323/320; 323/322
(58) Field of Classification Search ............... None
See application file for complete search history.

(56) References Cited

U.S. PATENT DOCUMENTS

| | | | |
|---|---|---|---|
| 3,275,922 A | 9/1966 | Meyer et al. | 321/15 |
| 3,869,631 A | 3/1975 | Anderson et al. | 313/217 |
| 4,480,211 A | 10/1984 | Eggers | 315/70 |
| 4,500,813 A | 2/1985 | Weedall | 315/276 |
| 4,893,063 A | 1/1990 | Pernyeszi | 315/307 |
| 4,922,155 A | 5/1990 | Morris et al. | 315/205 |
| 5,365,162 A * | 11/1994 | Sundhar | 323/320 |
| 5,530,319 A * | 6/1996 | Adam et al. | 315/106 |
| 5,859,506 A | 1/1999 | Lemke | 315/308 |
| 6,208,090 B1 | 3/2001 | Skilskyj et al. | 315/360 |
| 6,445,133 B1 | 9/2002 | Lin et al. | 315/57 |
| 2002/0047674 A1* | 4/2002 | Kita et al. | 315/DIG. 4 |

* cited by examiner

*Primary Examiner*—Tuyet Thi Vo
(74) *Attorney, Agent, or Firm*—Carlo S. Bessone

(57) ABSTRACT

A phase-control power controller that converts a line voltage to an RMS load voltage includes a phase-control circuit with a potentiometer and a capacitor whose resistance and capacitance determine clipping of a load voltage, a load sensing circuit that senses the load voltage and provides a DC signal that is different from but related to the RMS load voltage, and a comparator circuit that compares the DC signal to a reference and adjusts the resistance of the potentiometer to control the RMS load voltage.

7 Claims, 7 Drawing Sheets

PHASE-CONTROL POWER CONTROLLER WITH DIGITAL RMS LOAD VOLTAGE REGULATION

BACKGROUND OF THE INVENTION

The present invention is directed to a phase-control power controller that supplies a specified power to a load, and more particularly to a voltage converter for a lamp that converts line voltage to a voltage suitable for lamp operation.

Some loads, such as lamps, operate at a voltage lower than a line (or mains) voltage of, for example, 120V or 220V, and for such loads a voltage converter that converts line voltage to a lower operating voltage must be provided. The power supplied to the load may be controlled with a phase-control circuit that typically includes an RC circuit. Moreover, some loads operate most efficiently when the power is constant (or substantially so). However, line voltage variations are magnified by these phase-control circuits due to their inherent properties (as will be explained below) and the phase-control circuit is desirably modified to provide a (nearly) constant RMS load voltage.

When the phase-control power controller is used in a voltage converter of a lamp, the voltage converter may be provided in a fixture to which the lamp is connected or within the lamp itself. U.S. Pat. No. 3,869,631 is an example of the latter, in which a diode is provided in the lamp base for clipping the line voltage to reduce RMS load voltage at the light emitting element. U.S. Pat. No. 6,445,133 is another example of the latter, in which transformer circuits are provided in the lamp base for reducing the load voltage at the light emitting element.

Factors to be considered when designing a voltage converter that is to be located within a lamp include the sizes of the lamp and voltage converter, costs of materials and production, production of a potentially harmful DC load on a source of power for installations of multiple lamps, and the operating temperature of the lamp and an effect of the operating temperature on a structure and operation of the voltage converter.

SUMMARY OF THE INVENTION

An object of the present invention is to provide a novel phase-control power controller that converts a line voltage to an RMS load voltage and incorporates digital load regulation.

A further object is to provide power controller with a phase-control circuit having a digital potentiometer whose resistance determines clipping of a load voltage to control an RMS load voltage, a load sensing circuit that senses the load voltage and provides a DC signal that is different from but related to the RMS load voltage, and a comparator circuit that compares the DC signal to a reference and adjusts the resistance of the potentiometer to control the RMS load voltage.

A yet further object is to provide a lamp with this power controller in a voltage conversion circuit that converts a line voltage at a lamp terminal to the RMS load voltage usable by a light emitting element of the lamp.

DESCRIPTION OF PREFERRED EMBODIMENTS

Figure 1:
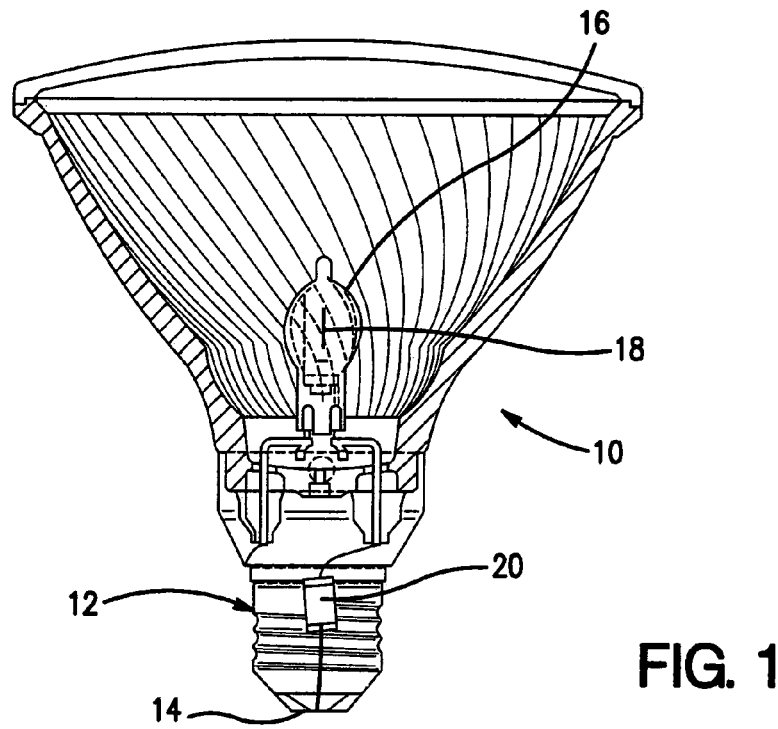
FIG. 1 is a partial cross section of an embodiment of a lamp of the present invention.

With reference to FIG. 1, a lamp 10 includes a base 12 with a lamp terminal 14 that is adapted to be connected to line (mains) voltage, a light-transmitting envelope 16 attached to the base 12 and housing a light emitting element 18 (an incandescent filament in the embodiment of FIG. 1), and a voltage conversion circuit 20 for converting a line voltage at the lamp terminal 14 to a lower operating voltage. The voltage conversion circuit 20 is within the base 12 and connected between the lamp terminal 14 and the light emitting element 18. The voltage conversion circuit 20 may be an integrated circuit in a suitable package as shown schematically in FIG. 1.

While FIG. 1 shows the voltage conversion circuit 20 in a parabolic aluminized reflector (PAR) halogen lamp, the voltage conversion circuit 20 may be used in any incandescent lamp when placed in series between the light emitting element (e.g., filament) and a connection (e.g., lamp terminal) to a line voltage. Further, the voltage conversion circuit described and claimed herein finds application other than in lamps and is not limited to lamps.

Figure 2:
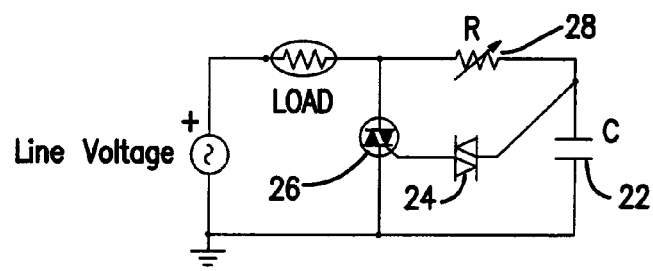
FIG. 2 is a schematic circuit diagram of a phase-controlled dimming circuit of the prior art.

The voltage conversion circuit 20 includes a phase-controlled dimming circuit, derived from a conventional phase-controlled dimming circuit such as shown in FIG. 2 that has a capacitor 22, a diac 24, a triac 26 that is triggered by the diac 24, and resistor 28. In a conventional dimming circuit, the resistor 28 may be a potentiometer that sets a resistance in the circuit to control a phase at which the triac 26 fires. A dimming circuit is a two terminal device intended to reside in series with a relatively small resistive load.

In operation, a dimming circuit such as shown in FIG. 2 has two states. In the first state the diac 24 and triac 26 operate in the cutoff region where virtually no current flows. Since the diac and triac function as open circuits in this state, the result is an RC series network such as illustrated in FIG.

3. Due to the nature of such an RC series network, the voltage across the capacitor 22 leads the line voltage by a phase angle that is determined by the resistance and capacitance in the RC series network. The magnitude of the capacitor voltage is also dependent on these values.

Figure 4:
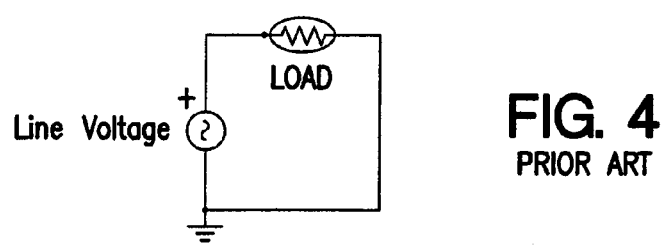
FIG. 4 is a schematic circuit diagram of the phase-controlled dimming circuit of FIG. 2 showing an effective state in which the triac has been triggered.

The voltage across the diac 24 is analogous to the voltage drop across the capacitor 22 and thus the diac will fire once breakover voltage is achieved across the capacitor. The triac 26 fires when the diac 24 fires. Once the diac has triggered the triac, the triac will continue to operate in saturation until the diac voltage approaches zero. That is, the triac will continue to conduct until the line voltage nears zero crossing. The virtual short circuit provided by the triac becomes the second state of the dimming circuit as illustrated in FIG. 4.

Figure 5:
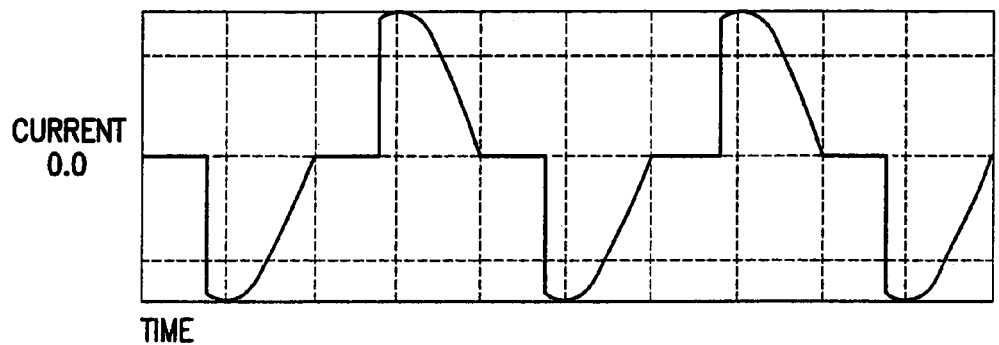
FIG. 5 is a graph illustrating current clipping in the phase-controlled dimming circuit of FIG. 2.
Figure 6:
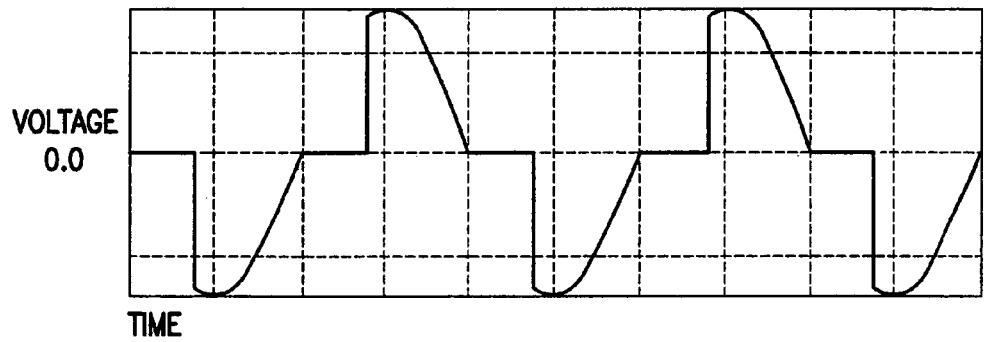
FIG. 6 is a graph illustrating voltage clipping in the phase-controlled dimming circuit of FIG. 2.

Triggering of the triac 26 in the dimming circuit is phase-controlled by the RC series network and the leading portion of the mains voltage waveform is clipped until triggering occurs as illustrated in FIGS. 5–6. A load attached to the dimming circuit experiences this clipping in both voltage and current due to the relatively large resistance in the dimming circuit.

Accordingly, the RMS load voltage and current are determined by the resistance and capacitance values in the dimming circuit since the phase at which the clipping occurs is determined by the RC series network and since the RMS voltage and current depend on how much energy is removed by the clipping.

Line voltage may vary from location to location up to about 10% and this variation can cause a variation in RMS load voltage in the load (e.g., a lamp) by an amount that can vary light levels, shorten lamp life, or even cause immediate failure. For example, if line voltage were above the standard for which the voltage conversion circuit was designed, the triac 26 may trigger early thereby increasing RMS load voltage. In a halogen incandescent lamp, it is particularly desirable to have a constant RMS load voltage. As will be explained below, there are several options for dealing with this problem.

Figure 7:
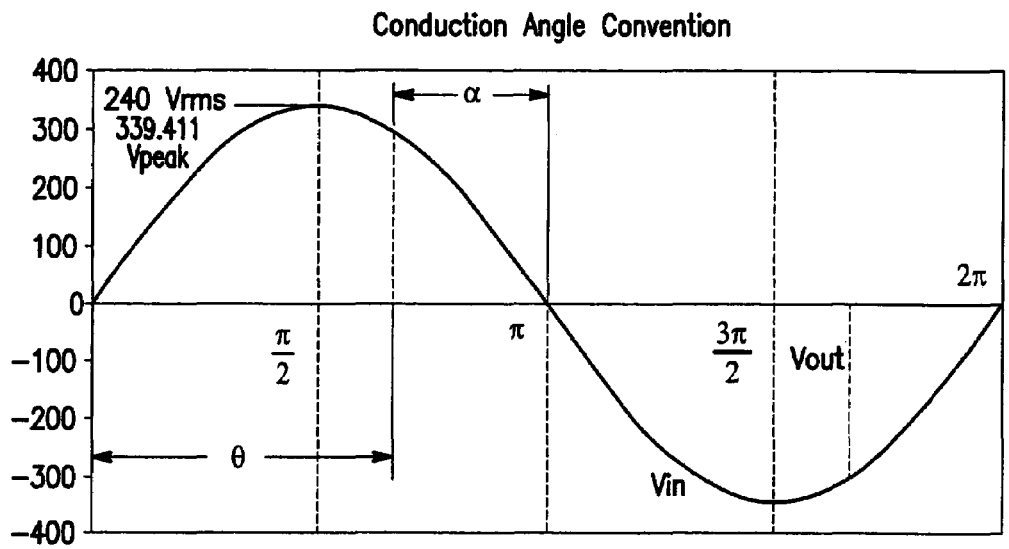
FIG. 7 is a graph showing the conduction angle convention adopted herein.

By way of background and with reference to FIG. 7, clipping is characterized by a conduction angle a and a delay angle θ. The conduction angle is the phase between the point on the load voltage/current waveforms where the triac begins conducting and the point on the load voltage/current waveform where the triac stops conducting. Conversely, the delay angle is the phase delay between the leading line voltage zero crossing and the point where the triac begins conducting.

Define $V_{lrms}$ as RMS line voltage, $V_{ip}$ as peak line voltage, $V_{orms}$ as RMS load voltage, $V_{op}$ as peak load voltage, T as period, and ω as angular frequency (rad) with $\omega=2\pi f$. The RMS voltage is determined from the general formula:

$$V_{orms} = \sqrt{\frac{1}{T}\int_0^T v^2(t)\,dt}$$

Applying the conduction angle defined above yields:

$$V_{orms} = \sqrt{\frac{1}{2\pi}\left[\int_{\pi-\alpha}^{\pi} V_{ip}^2 \sin^2(\omega)\,d\omega + \int_{2\pi-\alpha}^{2\pi} V_{ip}^2 \sin^2(\omega)\,d\omega\right]}$$

-continued $$V_{orms} = \sqrt{\frac{1}{2\pi}(2)\left[\int_{\pi-\alpha}^{\pi} V_{ip}^2 \sin^2(\omega)\,d\omega\right]}$$

$$V_{orms} = \sqrt{\frac{V_{ip}^2}{\pi}\left(\frac{\alpha - \sin\alpha\cos\alpha}{2}\right)}$$

$$V_{orms} = V_{ip}\sqrt{\frac{\alpha - \sin\alpha\cos\alpha}{2\pi}}$$

This relationship can also be used to define $V_{ip}$ in terms of $V_{orms}$ and α:

$$V_{ip} = V_{orms}\sqrt{\frac{2\pi}{\alpha - \sin\alpha\cos\alpha}}$$

Figure 8:
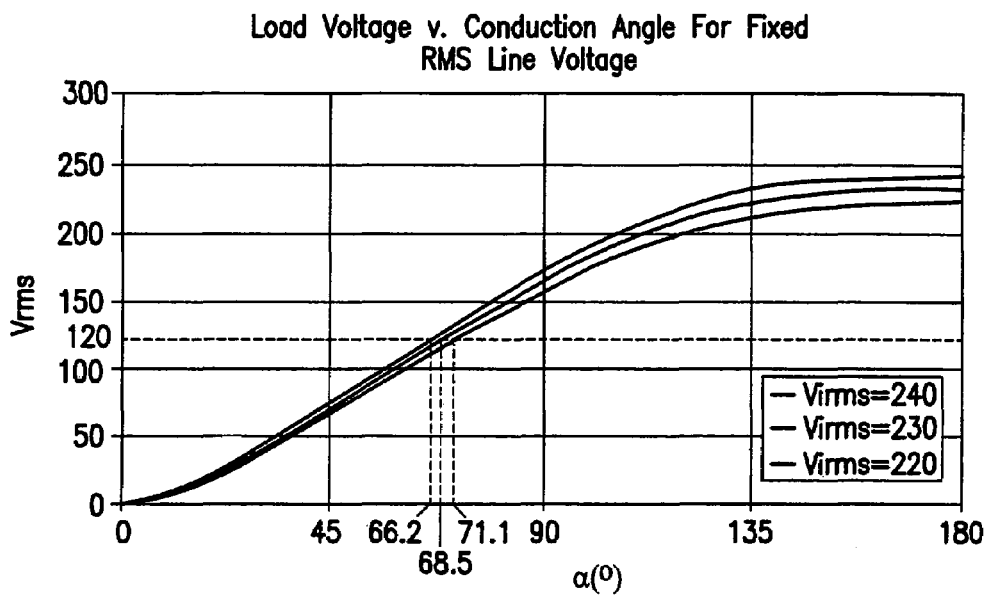
FIG. 8 is a graph showing the relationship of load voltage to conduction angle for several RMS line voltages.
Figure 9:
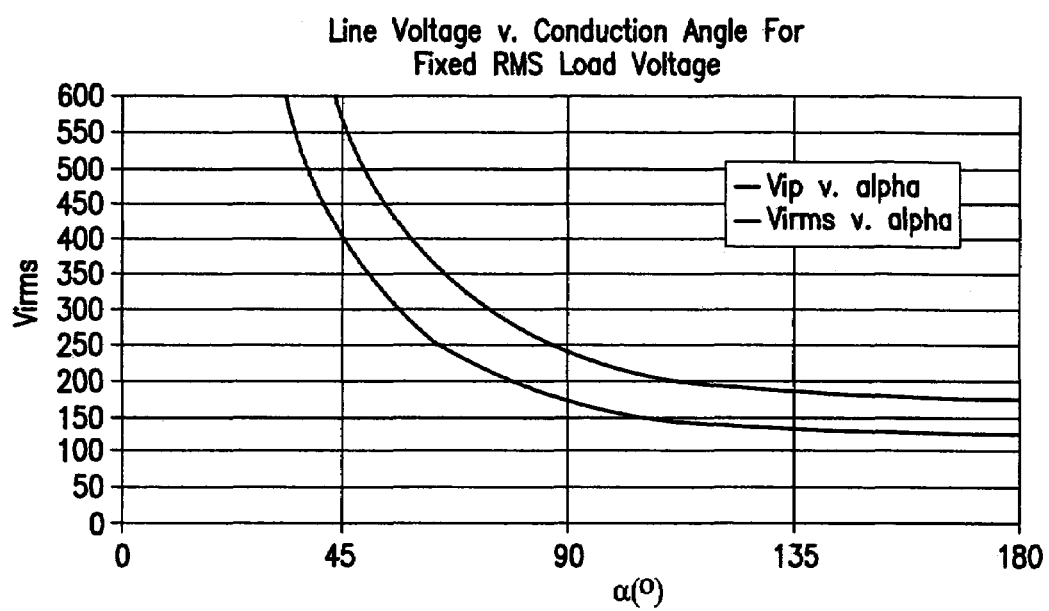
FIG. 9 is a graph showing the relationship of line voltage to conduction angle for fixed RMS load voltages.

Using these equations, the relationship between peak line voltage, RMS line voltage, RMS load voltage, and conduction angle α may be displayed graphically. FIG. 8 shows $V_{orms}$ as a function of conduction angle a for line voltages 220V, 230V and 240V. Note that small changes in line voltage result in larger changes in RMS load voltage. FIG. 9 shows the relationship of line voltage to conduction angle for fixed RMS load voltages. A lamp light emitting element (e.g., filament) is designed to operate at a particular load voltage, such as 120Vrms. As seen these graphs, the conduction angle required to achieve this load voltage depends on the RMS line voltage and the relationship is not linear. Changes in the line voltage are exaggerated at the load.

Figure 10:
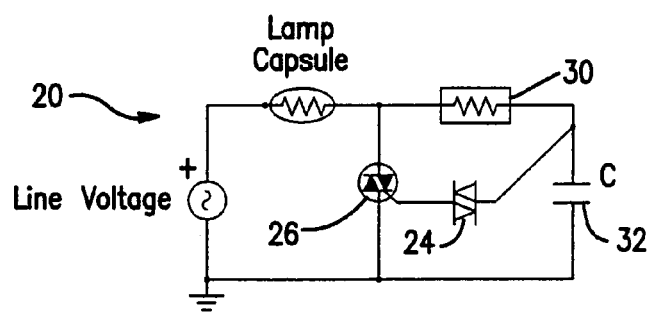
FIG. 10 is a schematic circuit diagram of a phase-controlled dimming circuit illustrating the concept of the present invention.

With reference to FIG. 10 that illustrates the concept of the present invention, one option for solving the problem of varying line voltages is to provide the voltage conversion circuit 20 that includes an RC series network with a resistance element 30 and a capacitor 32 whose resistance and capacitance cause a conduction angle that provides the RMS load voltage appropriate for the lamp.

Figure 3:
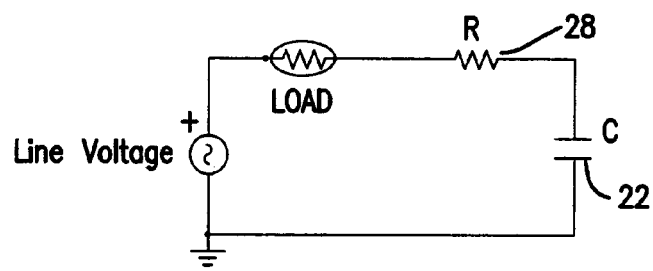
FIG. 3 is a schematic circuit diagram of the phase-controlled dimming circuit of FIG. 2 showing an effective state in which the triac is not yet triggered.

Recall that the conduction angle of triac triggering is dependent on the RC series portion of the dimming circuit. When selecting the resistance and capacitance for the voltage conversion circuit, it is preferable to pick an appropriate capacitance and vary the resistance. Consider how varying resistance affects triggering. In a simple RC series circuit (e.g., FIG. 3), the circuit resistance $R_T$ will be load resistance plus the resistance of the resistor. In application, the load resistance is very small compared to the resistance of the resistor and may be ignored. Using Kirchoff's voltage law the line source voltage $V_s$ can be written in terms of loop current I and element impedances:

$$V_S = I\left[R_T + \frac{1}{j\omega C}\right]$$

which may be rewritten:

$$I = \frac{j\omega C V_S}{j\omega R_T + 1}$$

This equation may be used to write an expression for the voltage across the capacitor:

$$V_C = I \frac{1}{j\omega C} = \frac{j\omega C V_S}{j\omega R_T C + 1}\left[\frac{1}{j\omega C}\right] = \frac{V_s(1 - j\omega R_T C)}{\omega^2 R_T^2 C^2 + 1}$$

The magnitude and phase relation of capacitor voltage with respect to reference line voltage can be calculated:

$$\text{Im}\{V_c\} = \frac{-V_s \omega R_t C}{\omega^2 R_T^2 C^2 + 1}$$

$$\text{Re}\{V_c\} = \frac{V_S}{\omega^2 R_T^2 C^2 + 1}$$

$$|V_C| = \sqrt{\text{Im}^2\{V_C\} + \text{Re}^2\{V_C\}} = \frac{V_S}{\sqrt{\omega^2 R_T^2 C^2 + 1}}$$

$$\angle\Theta_C = \tan^{-1}\left[\frac{\text{Im}\{V_C\}}{\text{Re}\{V_C\}}\right] = \tan^{-1}(-\omega R_T C)$$

The equations for capacitor voltage magnitude and phase delay show how the value of $R_T$ affects triggering. Diac triggering occurs (and thus triac triggering also occurs) when $V_C$ reaches diac breakover voltage. If capacitance and circuit frequency are fixed values, then $R_T$ and $V_S$ are the only variables that will affect the time required for $V_C$ to reach the diac breakover voltage.

Figure 11:
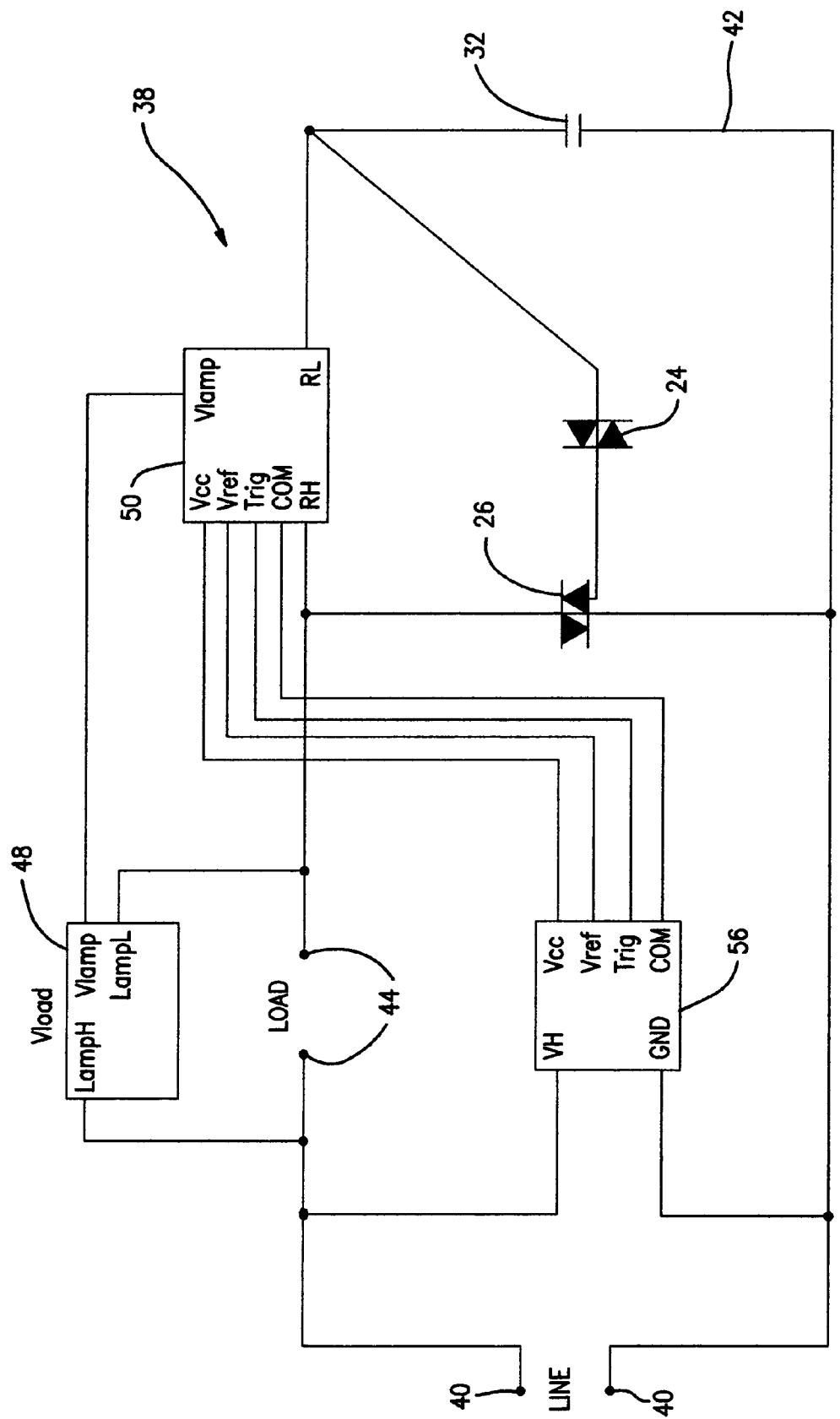
FIG. 11 is a schematic circuit diagram of an embodiment of the present invention.

With reference now to FIG. 11, an embodiment of the phase-control power controller 38 of the present invention converts a line voltage at the line terminals 40 to an RMS load voltage. The controller 38 includes a phase-control circuit 42 that is connected to the line terminals 40 and load terminals 44 and that includes a potentiometer 46 (FIG. 13, connected across RH and RL) and the capacitor 32 that clip the load voltage in the manner described above. A load sensing circuit 48 connected across the load terminals 44 senses the load voltage (at LampH and LampL) and provides a DC signal (Vlamp) that is related to the RMS load voltage. A comparator circuit 50 is connected to the phase-control circuit and to the load sensing circuit 48 and compares the DC signal from the load sensing circuit 48 to a reference (Vref) and adjusts a resistance of the potentiometer 46 in response to the comparison to control the RMS load voltage.

Figure 12:
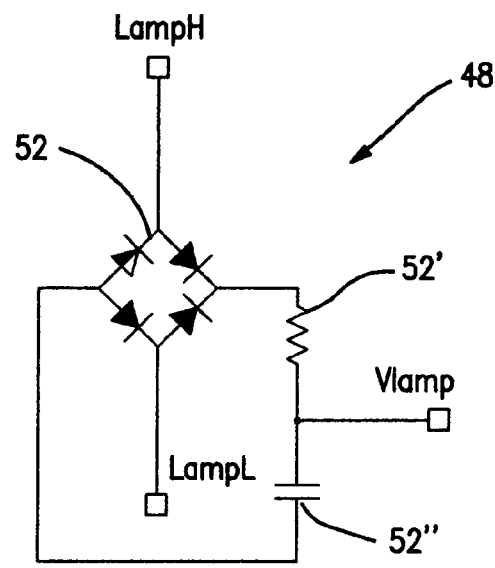
FIG. 12 is a schematic circuit diagram of a load sensing circuit of the embodiment of FIG. 11.

The DC signal (Vlamp) is different from but related to an RMS load voltage. In a preferred embodiment and with reference to FIG. 12, the load sensing circuit 48 may be digital and include a full-wave bridge 52 that sets the DC signal (Vlamp) to correspond to a peak of the clipped load voltage. Current limiting resistor 52' ensures that minimal current is drawn from the load. The full-wave bridge 52 and filter capacitor 52" set the DC signal level as the peak of the clipped load voltage waveform. Note that this is not the as RMS load voltage, but this value is related to RMS load voltage and thus the reference (Vref) may be set accordingly.

Figure 13:
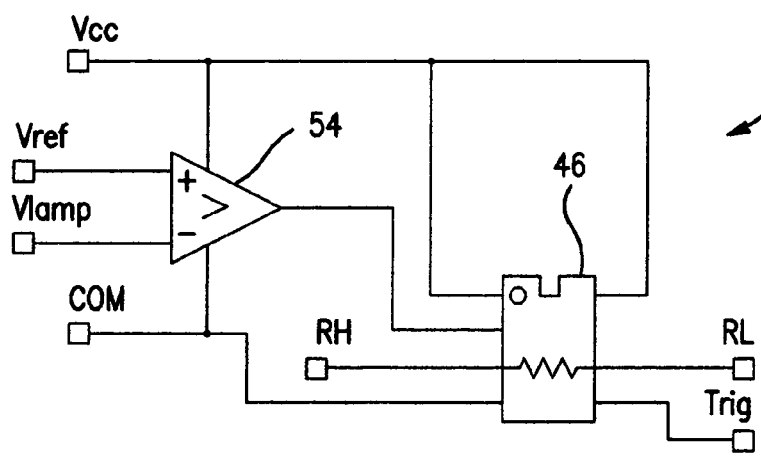
FIG. 13 is a schematic circuit diagram of a comparator circuit of the embodiment of FIG. 11.

With reference to FIG. 13, the comparator circuit 50 may include a comparator 54 that receives the DC signal (Vlamp) and the reference (Vref) and provides an output to the potentiometer 46 to control the resistance provided by the potentiometer 46. The potentiometer 46 is, in a preferred embodiment, a digital potentiometer. The potentiometer increases resistance if the DC signal is greater than the reference, thereby decreasing conduction angle and decreasing RMS load voltage. Conversely, the potentiometer decreases resistance if the DC signal is less than the reference, thereby increasing the delay angle and increasing RMS load voltage.

Figure 14:
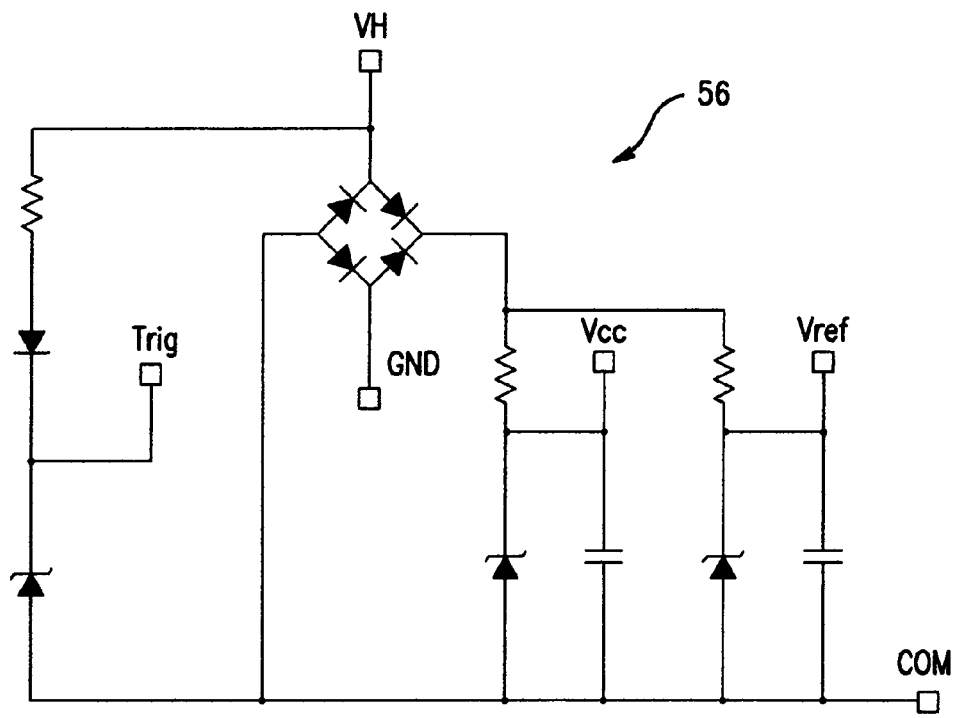
FIG. 14 is a schematic circuit diagram of a reference generator of the embodiment of FIG. 11.

With reference to FIGS. 11 and 14, the controller 38 further include a trigger circuit 56 that establishes the DC power level (Vcc) that is used by the comparator circuit 50 and potentiometer 46, a common voltage (Com), a trigger signal level (Trig) for the potentiometer 46 (a digital potentiometer uses a pulsing trigger signal for sampling), and the reference (Vref).

By way of further explanation, a preferred embodiment of the invention includes voltage conversion circuit 38 that has (a) digital load voltage sensor 48 that provides an output different from but related to an RMS load voltage and (b) phase-controlled dimming circuit 42 that has digital potentiometer 46 that varies a resistance in the phase-controlled dimming circuit 42 responsive to the output from load voltage sensor 48.

Figure 15:
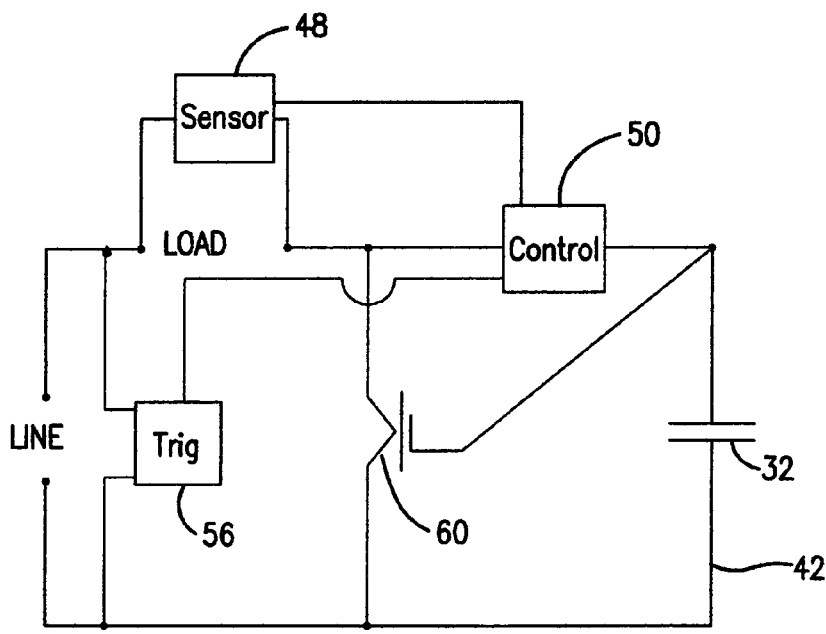
FIG. 15 is a schematic circuit diagram of a further embodiment of the present invention.

The phase-controlled power controller may, in an alternative embodiment, include an insulated gate bipolar transistor (IGBT) 60 instead of the diac 24 and triac 26 as illustrated schematically in FIG. 15. The operation of the IGBT 60 corresponds to that of the combination of the diac 24 and triac 26 and may be suitable for high voltage operation (e.g., above 300V).

The description above refers to use of the present invention in a lamp. The invention is not limited to lamp applications, and may be used more generally where resistive or inductive loads (e.g., motor control) are present to convert an unregulated AC line or mains voltage at a particular frequency or in a particular frequency range to a regulated RMS load voltage of specified value.

While embodiments of the present invention have been described in the foregoing specification and drawings, it is to be understood that the present invention is defined by the following claims when read in light of the specification and drawings.

We claim:

1. A phase-control power controller that converts a line voltage to an RMS load voltage, the controller comprising:
   line terminals for a line voltage and load terminals for a load voltage;
   a phase-control circuit connected to said line and load terminals and having a potentiometer and a capacitor that clip the load voltage;
   a load sensing circuit connected across said load terminals that senses the load voltage and provides a DC signal that is related to an RMS load voltage; and
   a comparator circuit connected to said phase-control circuit and said load sensing circuit and that compares the DC signal to a reference and adjusts a resistance of said potentiometer in response to the comparison to control the RMS load voltage.

2. The controller of claim 1, wherein said load sensing circuit comprises a full-wave bridge that sets the DC signal to a peak of the clipped load voltage.

3. The controller of claim 1, wherein said comparator circuit comprises a comparator that receives the DC signal and the reference, and wherein said potentiometer is a digital potentiometer that receives an output from said comparator that controls the resistance of said digital potentiometer.

4. The controller of claim 1, wherein said phase-control circuit further comprises a diac and a triac that is triggered by said diac.

5. The controller of claim 1, wherein said phase-control circuit further comprises an insulated gate bipolar transistor (IGBT).

6. The controller of claim 1 in an integrated circuit that is connected between a terminal of a lamp and a light emitting element of said lamp.

7. The controller of claim 1, wherein said comparator circuit varies the resistance of said potentiometer so as to maintain the RMS load voltage substantially constant.

* * * * *